S. NEWMAN.
TOOTH MEASURING INSTRUMENT.
APPLICATION FILED DEC. 26, 1911.

1,061,398.

Patented May 13, 1913.

Witnesses:
Olive B. King
C. D. Morrill

Samuel Newman, Inventor
By his Attorney
Samuel C. Yeaton.

UNITED STATES PATENT OFFICE.

SAMUEL NEWMAN, OF NEW YORK, N. Y.

TOOTH-MEASURING INSTRUMENT.

1,061,398.  Specification of Letters Patent.  Patented May 13, 1913.

Application filed December 26, 1911. Serial No. 667,955.

*To all whom it may concern:*

Be it known that I, SAMUEL NEWMAN, a citizen of the United States, residing in the city, county, and State of New York, have invented certain new and useful Improvements in Teeth-Measuring Instruments, of which the following is a specification.

My invention relates to teeth measuring instruments, and the object is to devise an instrument by means of which the size of crowns may be readily ascertained, in such manner as to improve on the prior manner of conducting crown and bridge work.

A preferred construction of such an instrument is shown in the accompanying drawings forming a part of the specification, wherein—

Figure 1:
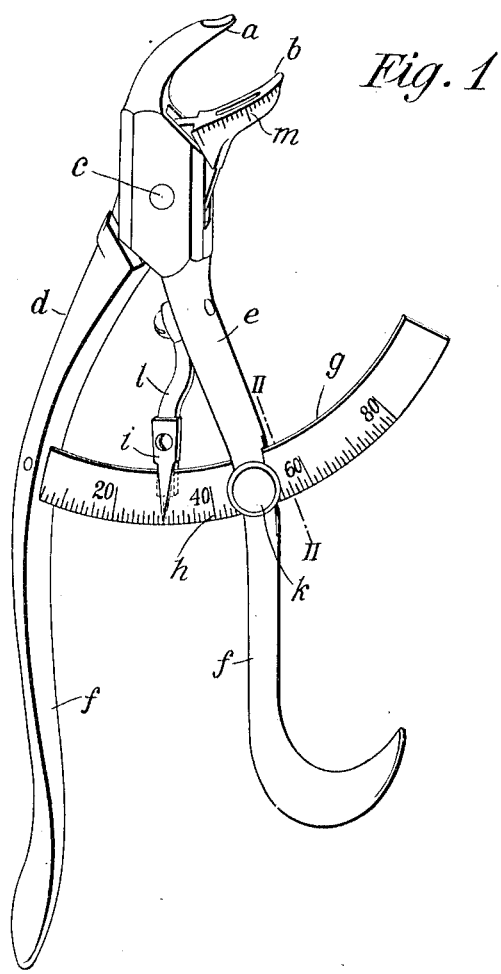
Figure 2:
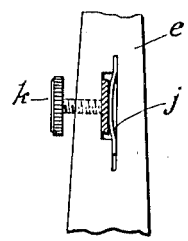

Figure 1 is a perspective view of such a device; and Fig. 2 is a fragmental section through the line II—II of Fig. 1.

The essential features of such a device include members that may be brought into contact with the tooth being measured at opposite points thereon in order that any dimension may be determined through the crown of the tooth, and measuring means that will indicate the degree that the members are apart, which, as is obvious, will denote the size of the tooth through the points of contact of the members.

The members for contacting with the teeth are indicated in the drawing by the letters $a$, $b$. I prefer to cross them and pivotally connect them by a pin $c$. This permits them to move angularly about their common point to separate to such a degree as is necessary to embrace the tooth at any points, and thus constitute a pair of jaws that may be opened or closed as required. I do not wish to limit myself to this construction, however, for I claim broadly any members that may be opened to embrace opposite sides of a tooth at any desired points, which opening will operate the measuring mechanism (which forms no part of the jaws) to denote the degree of opening of the members. The construction shown, however, is simple, and makes a simple construction feasible for the measuring feature. The jaws $a$, $b$ are extended beyond their pivotal connection forming the branches $d$, $e$. These open and close with the opening and closing of the jaws to an amount in direct proportion therewith, and provide an easy means for determining the degree of opening of the jaws, as will later be described. The arms are extended sufficiently to constitute a pair of handles $f$, $f$, which may be manipulated in the fashion of forceps to control the opening and closing of the jaws. The specific style of instrument shown in this instance is in fact much the shape of an ordinary pair of forceps, and a type is here shown of a preferred form to reach any part of either set of teeth.

The opening and closing of the arms $d$, $e$ are utilized for measuring the opening and closing of the jaws through the employment of a graduated plate or bar $g$, provided with a convenient scale of graduations $h$. The scale is rigidly secured to one of the arms, as the arm $d$, and instead of the other arm being used as an indicator for the scale, I prefer to provide a separate indicator $i$, which is rigidly secured to the arm $e$.

In order to make small movements easily readable, I increase the distance of the scale from the pivotal pin $c$ to twice that of the jaws. This, however, is only for convenience, and in order to obtain direct readings of the opening of the jaws the bar is graduated by a scale of 1 to 2, that is to say, if 40, for instance, is read on the scale, it will indicate the jaws are open 40 millimeters, whereas the indicator will have actually traveled 80 millimeters. The scale is preferably made in the form of an arc, and the arm $e$ is slotted to receive its free end to aid in supporting it while permitting it to slide to and fro therein. A spring $j$ is provided in the slot, which presses against the scale bar, to offer frictional resistance against the movement of the jaws. This ordinarily will hold the device in a set position until a reading can be taken, but should there be danger of a displacement of the jaws, a set screw $k$ is provided that will firmly hold the parts until the reading is taken. The indicator $i$ tapers to a point in the usual manner, and is mounted on a bar $l$ screwed to the arm $e$, which is preferably extended behind the scale to better strengthen the indicator. One of the jaws, as the jaw $b$, is provided with graduations $m$, which may be used to determine the height of the tooth.

This device is especially useful in obtaining data that may be used in determining the size shell required for crown and bridge work. In such instances the height of the crown is taken, and then the distance through the tooth from front to back is taken, and likewise the distance through the tooth from side to side. The half of the sum of these last two dimensions is used as the diameter of the shell required.

Having thus described my invention, I claim:

A tooth measuring instrument, comprising a pair of jaws pivotally connected to adapt them to have relative movement to bring them into contact with opposite sides of a tooth, branches extending from the jaws on the opposite sides of the pivotal connection responding to the movement of the jaws, handles terminating the branches for holding the instrument and operating the jaws, a graduated curved bar secured to one branch and slidably mounted through a slot of the other branch, a friction spring in the slot pressing the bar, a set screw extending in the slot to vary the pressure of the spring to hold the bar in adjusted position, and an indicator for said scale secured to the said other branch to indicate the amount of separation of the jaws.

In testimony whereof I have hereunto set my hand in the presence of two witnesses.

SAMUEL NEWMAN.

Witnesses:
 GERARDO CERASUOLO,
 HERY ROTHLEIN.

---

Copies of this patent may be obtained for five cents each, by addressing the "Commissioner of Patents, Washington, D. C."